United States Patent

Littrell

[15] 3,671,706
[45] June 20, 1972

[54] SHEET-GRIPPER POST FORMED BY EDM

[72] Inventor: Luther W. Littrell, West Carrollton, Ohio
[73] Assignee: Harris-Intertype Corporation, Cleveland, Ohio
[22] Filed: Sept. 21, 1970
[21] Appl. No.: 74,027

[52] U.S. Cl. .................................................219/69 M, 101/412
[51] Int. Cl. ..............................................................B23p 1/08
[58] Field of Search ...................219/69 D, 69 E, 69 R, 69 M, 219/69 V

[56] References Cited

UNITED STATES PATENTS

| | | | |
|---|---|---|---|
| 2,933,040 | 4/1960 | Helmig | 101/412 |
| 2,785,280 | 3/1957 | Eisler et al. | 219/69 V |
| 3,205,335 | 9/1965 | Johnston et al. | 219/69 V |
| 3,149,218 | 9/1964 | Celovsky | 219/69 V |
| 3,035,151 | 5/1962 | Weglarz | 219/69 E |
| 3,467,807 | 9/1969 | Livshits et al. | 219/69 C |

Primary Examiner—R. F. Staubly
Attorney—Yount and Tarolli

[57] ABSTRACT

A gripper post cooperates with a gripper finger to grip a sheet therebetween. The gripper post comprises a body and a plurality of raised portions. The plurality of raised portions are distributed throughout a surface of the body and have substantially coplanar contact surfaces for contacting the sheet when the sheet is gripped thereby. The raised portions are defined by valleys surrounding the raised portions and are formed by an electrical discharge machining process.

1 Claim, 10 Drawing Figures

Patented June 20, 1972

INVENTOR
LUTHER W. LITTRELL

BY Yount and Tarolli
ATTORNEYS

INVENTOR
LUTHER W. LITTRELL
BY Yount and Tarolli
ATTORNEYS

Patented June 20, 1972

INVENTOR
LUTHER W. LITTRELL

BY Yount and Tarolli
ATTORNEYS

SHEET-GRIPPER POST FORMED BY EDM

The present invention relates to a gripper post for cooperating with a gripper finger to grip a sheet therebetween and, more particularly, relates to a gripper post formed by electrical discharge machining.

The gripper post of the present invention is preferably designed for use in a printing press to convey sheets therethrough. In an offset press, a sheet is printed when it passes through a printing nip defined by an impression cylinder and a blanket cylinder. The sheet is held by grippers on an impression cylinder and is carried around the impression cylinder upon rotation thereof. As the sheet passes through the printing nip, tacky inks are transferred from the blanket cylinder to the sheet and the sheet tends to adhere to the blanket cylinder. This can result in movement of the sheet relative to the gripper post, particularly if a portion of the sheet is in the printing nip at the time the grippers on the impression cylinder transfer the sheet to other grippers. Such displacement of the sheet will adversely affect the registration between the impressions of the successive printing units and can cause smudging and blurring of the printed product.

Numerous efforts have been made to solve the aforementioned problem by providing a gripper post with a high coefficient of friction, and one solution is disclosed in U.S. Pat. No. 2,933,040, assigned to the assignee of the present invention. U.S. Pat. No. 2,933,040 discloses a gripper post having a frictional surface which includes raised portions and complementary valleys therebetween which are formed in the post by chemically etching a metal blank. After such an etching process takes place, the gripper post is hardened to increase its durability. Such a gripper post has an extremely high gripping power and is effective to solve the afore-mentioned problem.

However, the surface finish of a gripper post manufactured by such a chemical etching process provides a ragged surface which, in some cases, makes undesirable impressions in the sheet. A further disadvantage of such a gripper post is that the process of hardening the post after formation thereof produces many scrap parts. Since the etching process has already been performed on the post before the hardening process, such scrap significantly increases the cost of the posts produced by such a process.

The present invention provides a gripper post for cooperating with a gripper finger to grip a sheet therebetween. The gripper post includes a body and a plurality of raised portions distributed throughout a surface of the body. The raised portions have substantially coplanar contact surfaces for contacting the sheet and are defined by valleys surrounding the raised portions. The valleys are formed in a member by electrical discharge machining a surface of the member to provide the raised portions and the valleys. When the gripper post is formed by the electrical discharge machining process, the surfaces of the raised portions and valleys are surface-hardened as they are formed.

The electrical discharge machining process allows the gripper posts to be made without an excessive amount of scrap parts. This results in a substantial decrease in the manufacturing costs of such gripper posts as compared with an etched gripper post. This is partially due to the fact that the electrical discharge machining process allows the member from which the gripper post is formed to be hardened before forming the raised portions and valleys. Moreover, a gripper post made by electrical discharge machining is quite effective as a sheet gripper and has a high coefficient of friction. The surface produced on a gripper post by electrical discharge machining has a uniform surface finish and a substantially uniform coefficient of friction.

The gripper post of the present invention is formed from a member by electrical discharge machining a surface of the member to form raised portions and valleys. The member is hardened and then positioned adjacent to and a predetermined distance from an electrode having first portions corresponding to the valleys and recessed portions corresponding to the raised portions of the gripper post. A dielectric fluid is provided between the electrode and the member and opposite electrical charges are induced between the electrode and the member, so that the surface of the member is erroded to produce the gripper post having raised portions and valleys therebetween.

Accordingly, it is an object of the present invention to provide a gripper post which cooperates with a gripper finger to grip a sheet and which is extremely effective in operation and can be manufactured at low cost with a minimum of waste.

It is a further object of the present invention to provide a new and improved gripper post having a gripping surface defined by raised portions surrounded by valleys in which the raised portions are formed by the electrical discharge machining of a surface to form the raised portions and valleys.

Further objects and advantages of the present invention will be apparent to those skilled in the art to which it relates from the following detailed description of a preferred embodiment thereof made with reference to the accompanying drawings forming a part of this specification and in which.

Figure 1:
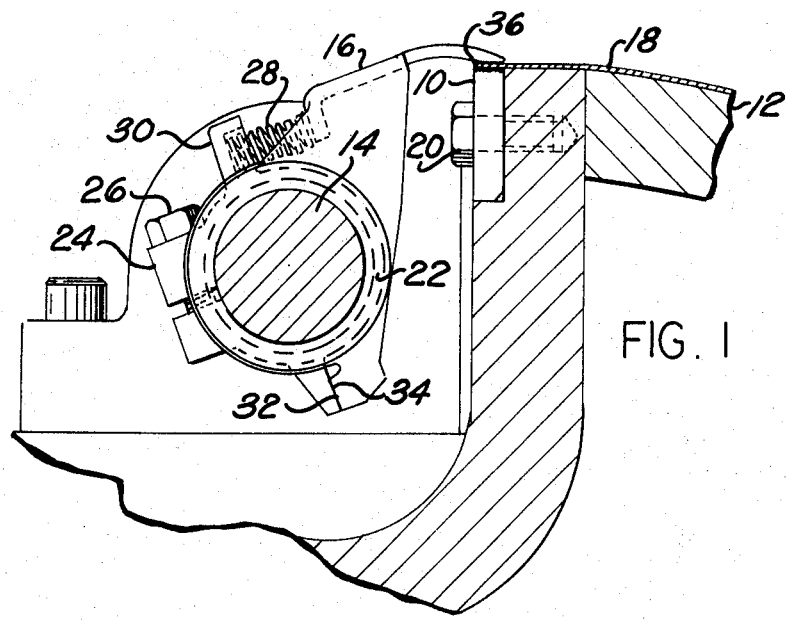
FIG. 1 is a sectional elevational view of a gripper finger and a cooperating gripper post mounted on a portion of a cylinder of a printing press.

The present invention provides a gripper post for cooperating with a gripper finger to grip a sheet therebetween. Such a gripper post and gripper finger are utilized in various machines for feeding sheet material, and a primary use thereof is in a printing press. The gripper post of the present invention has a plurality of raised portions with valleys therebetween distributed throughout a surface of a body. The raised portions and valleys are formed by electrical discharge machining. Such a gripper post is extremely economical to produce, since less scrap is realized by using the electrical discharge machining process, as opposed to known methods of manufacture. The present invention may be applied to gripper posts of a wide variety of constructions and designs and for purposes of illustration is described in the drawings as applied to the gripper post 10, as shown in FIG. 1.

The gripper post 10 of the present invention is secured to a cylinder 12, which may be a transfer cylinder, an impression cylinder, or the like, of a printing press. The cylinder 12 has an oscillating gripper shaft 14 rotatably mounted thereon. The gripper shaft 14 has a plurality of gripper fingers 16 which cooperate with a similar plurality of gripper posts 10 to grip the sheet 18 therebetween and assist in conveying the sheet through the press upon rotation of the cylinder 12. FIG. 1 shows one representative environment for the gripper post 10 of the present invention. It is to be understood that other environments and mounting techniques may be utilized without departing from the spirit of the present invention.

The gripper post 10 is secured to the cylinder 12 by any conventional means, such as the threaded fasteners 20. The gripper finger 16 is rotatably mounted about the shaft 14 by means of the flange bearings 22 which are secured to the gripper finger 16. A gripper dog 24 is secured to the shaft 14 between the sides of the fingers 16 by means of a clamping screw 26. A biasing spring 28 is positioned intermediate the finger 16 and the dog 24 and urges the gripper finger clockwise, as seen in FIG. 1, away from the spring seat 30 of the gripper dog 24.

When the shaft 14 is rotated in a counterclockwise direction, an extension 32 of the dog 24 contacts a complementary extension 34 of the gripper finger 16 to rotate the finger 16 in a counterclockwise direction so that the finger 16 does not engage the sheet. When the shaft 14 is rotated to an engaged position, as shown in FIG. 1, so that the sheet is gripped, the tip of the finger 16 engages the end of the sheet 18 and a slight separation of the extensions 32, 34 occurs. Such a separation allows the spring 28 to clamp the sheet 18 between the gripper finger 16 and the gripper post 10 with a preselected force dependent on the compression of the spring.

Figure 2:
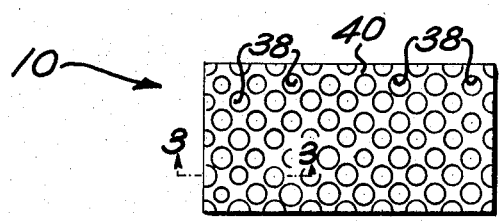
FIG. 2 is an enlarged top view of the gripper post shown in FIG. 1.
Figure 3:
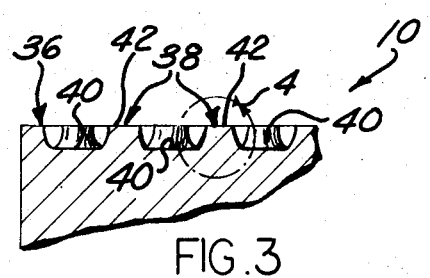
FIG. 3 is an enlarged sectional view of the gripper post shown in FIG. 2, taken along lines 3—3 thereof.

In order to provide the gripper post 10 with a surface 36 which has a coefficient of friction sufficient to prevent sheet movement relative thereto, the raised portions 38, as seen in FIG. 2, are provided. The raised portions 38 are surrounded by valleys 40, as seen in FIGS. 2 and 3. The raised portions include contact surfaces 42 which contact the sheet 18 when the sheet is gripped between the gripper finger 16 and gripper post 10.

Figure 4:
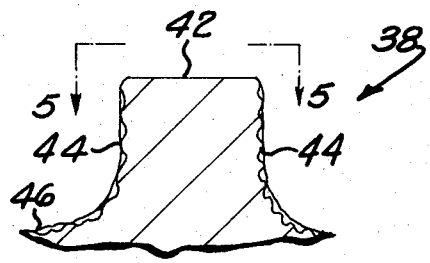
FIG. 4 is a greatly enlarged elevational sectional view of one of the raised portions of the post shown in FIG. 3 and indicated by the circle 4 thereof.
Figure 5:
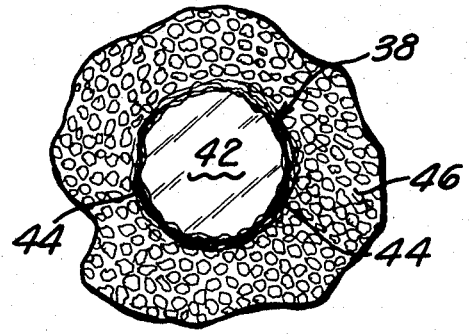
FIG. 5 is a greatly enlarged top view of the raised portion shown in FIG. 4 and taken along lines 5—5 thereof.

One representative raised portion 38 is shown in FIGS. 4 and 5. The contact surface 42 has a smooth finish and is generally circular in cross section, as shown in FIG. 5. It should be understood that the contact surface may have other shapes. The periphery of the flat contact surface 42 is defined by the sides 44 which also define a portion of the valleys 40.

The valleys 40 also include the lower surface 46 adjacent to the raised portions 38. The surface finish of the sides 44 and lower surface 46 has a uniform roughness. Such roughness does not vary the gripping qualities of the gripper post 10, since only the finished contact surfaces 42 grip the sheet 18. By varying the density and size of the raised portions 38, the frictional characteristics of the gripper post 10 may be controlled.

When a sheet 18 is gripped between the gripper post 10 and the gripper finger 16, the contact surfaces 42 of the raised portions 38 create sufficient friction between the sheet 18 and the gripper post 10 to minimize movement of the sheet 18 with respect to the gripper post, even during printing with tacky ink, as noted above. It should also be understood that the contact surfaces 42 of the raised portions 38 are flat so that the sheet 18 is not perforated or ripped when the sheet is gripped thereby.

The gripper post 10 of the present invention is formed by electrical discharge machining a member 48, as seen in FIG. 1, in an electrical discharge apparatus 79, which is known. The electrical discharge machining apparatus 79 herein disclosed is designed to form a plurality of gripper posts simultaneously, but it should be understood that such an apparatus may be designed to form any number or shapes of various gripper posts.

In order to effect such machining, the members 48 are hardened by any process well known to those skilled in the art. It should be understood that the members 48 may have their surfaces 36 finished before the electrical discharge machining process, as will hereinafter be more fully described. The members 48 are then positioned adjacent to and a predetermined distance from an electrode, generally indicated at 50 in FIG. 6, and forming a part of the electrical discharge machining apparatus 79.

Figure 6:
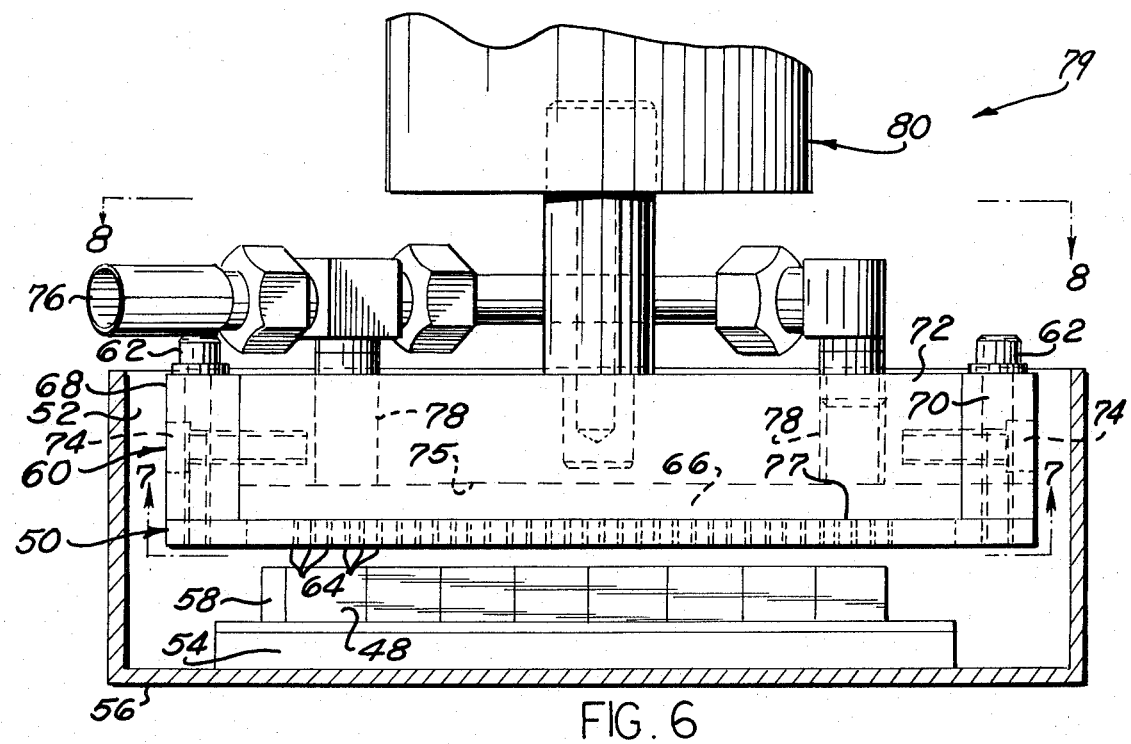
FIG. 6 is a side elevational view of an electrical discharge machining apparatus for forming the gripper posts.

More specifically, after the members 48 are hardened, they are positioned on a base member 54 of a tank 56. The base member 54 has a positioning stop 58 secured thereto so that a plurality of members 48 may be properly positioned with respect to the electrode 50, as shown in FIG. 6. By so positioning the members 48 and/or electrode 50, the raised portions and valleys may be properly formed with respect to the members 48 by the electrical discharge machining apparatus. The members 48 are held on the bottom plate 54 of a magnetic chuck therein. It should be understood that other holding means, such as a fixture, vise or clamps, may be used to retain the members 48 in a fixed position on the base 54 of the electrical discharge apparatus 79.

A dielectric fluid 52 is provided between the electrode 50 and the members 48, whereupon opposite electrical charges are induced between the electrode 50 and the members 48. The dielectric fluid between the electrode and the members is ionized by the opposite electrical charges thereby eroding the members 48 to produce the gripper posts 10 of the present invention. The raised portions 38 of the gripper post then have their contact surfaces 42 finished so that each of the contact surfaces 42 of the gripper post are in the same plane.

Figure 8:
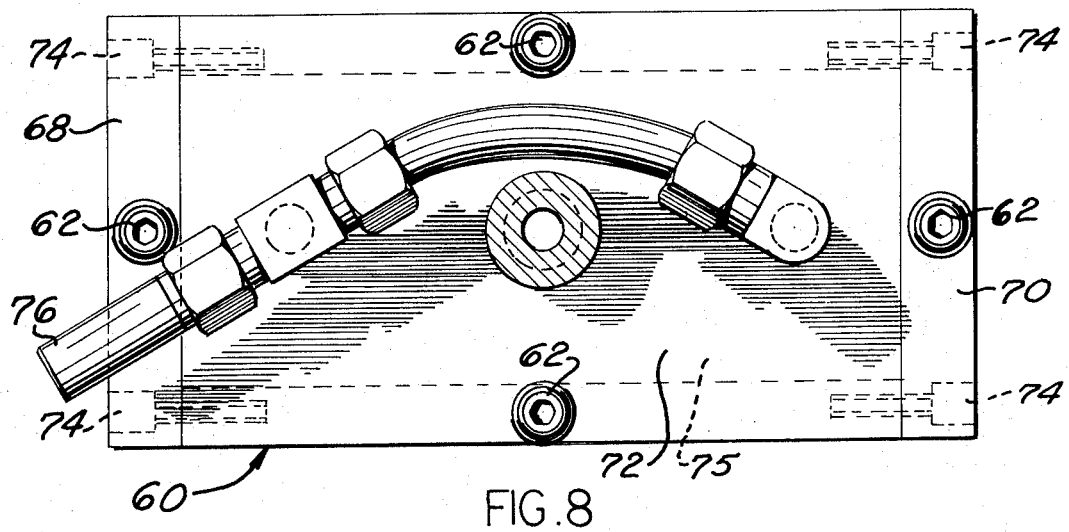
FIG. 8 is a top view of a portion of the electrical discharge machining apparatus shown in FIG. 6 and taken along the line 8—8 thereof.

The electrode 50 is secured to a holder 60 by any conventional means, such as the threaded fasteners 62, as seen in FIGS. 6 and 8. The electrode 50 also has a plurality of openings 64 distributed throughout its surface so that when the opposite charges are induced on the electrode 50 and members 48, the material of the members 48 does not erode in the area of the openings 64. As a result, the size and shape of the openings 64 determine the size and shape of the raised portions 38. The openings 64 also extend completely through the electrode so that the passageway 66 in the holder 60 is in fluid communication therewith for supplying pressurized fluid through the openings 64 to wash away the metal particles which are eroded from the members 48 by the electrical discharge between the electrode 50 and the members 48.

The holder 60 includes two end plates 68, 70 (see FIG. 8) and a holder plate 72 interposed therebetween. The end plates 68, 70 are secured to the holder plate 72 by means of threaded fasteners 74. The holder plate 72 has a portion 75 removed therefrom. The holder plate 72, end plates 68, 70 and upper surface 77 of the electrode 50 define a chamber 66 which is in communication with all of the openings 64 in the electrode 50. A conduit 76 provides a supply of pressurized fluid to the chambers 66 through passageway 78 in the holder plate 72. The pressurized fluid contained in the chamber 66 is distributed therefrom to each of the openings 64 in the electrode 50 so that pressurized fluid flows therefrom and washes away the material eroded by the electrical discharge between the electrode 50 and the members 48.

The holder 60 is connected to the upper ram 80 of the electrical discharge apparatus 79 which serves to position the electrode 50 a predetermined distance from the members 48. The upper ram 80 is movable to move the electrode 50 toward the member 48 at a predetermined rate during the electrical discharge machining process so that the predetermined distance is maintained between the member and electrode.

The fluid in the form of a dielectric hydrocarbon oil is provided in the tank 56 so that the fluid lies between the electrode 50 and the members 48. When opposite electrical charges are induced in the electrode 50 and member 48, the oil extending between the electrode and the member becomes a conducting column of ionized dielectric fluid which provides for controlled erosion of the workpiece 48. The bath also serves to transfer the spark between the electrode and the workpiece in a controlled direction, to accelerate the removal of eroded material, cool the electrode and prevent fusion of the electrode to the workpiece.

When the opposite electrical charges are induced in the electrode 50 and workpiece 48, a portion of the workpiece is eroded by the controlled thermal action of electric current on the conducting materials. The workpiece is eroded so that it conforms to the configuration of the electrode. The sparks passing between the electrode and workpiece create a pitted surface as particles are removed from the members 48, and the raised portions 38 and valleys 40 are produced as seen in FIGS. 4 and 5. It is characteristic of the electrical discharge machining process that the pitted surface has a uniform roughness and does not have any directional characteristics.

As the material is eroded from the members 48, the electrode 50 is moved by the ram 80 toward the workpiece or member 48 so that the predetermined distance or gap between the electrode or workpiece is maintained. The movement of the electrode toward the workpiece is maintained until the raised portions 38 are produced having the desired height. THe removal rate of the workpiece material is dependent on the size of the machining area, the shape and construction of the workpiece to be eroded, and the electrical parameters of the electrode material, and other factors well known to those skilled in the electrical discharge machining art.

During removal of material from the member 48, a continuous cold quench process occurs. The electrical discharge machining takes place at approximately 10,000° F. The dielectric fluid is at an ambient temperature of 70° F. As material is removed from the hardened member 48, a continuous shock, cold quench process occurs wherein the spark created erosion zone is heated by the electrical spark and is subsequently quenched by the dielectric fluid. This increases the hardness of the area of the workpiece 48 which is formed into the gripper post 10 of the present invention.

When the raised portions 38 are of a sufficient height, the opposite electrical charges of the electrode 50 and member 48 are no longer induced and the ram 80 and, consequently, the electrode 50 are retracted so that the gripper posts 10 formed from the members 48 may be removed from the member 54. The magnetic chuck is demagnetized to allow the gripper post to be readily removed from the member 54.

The upper or contact surface 42 of the raised portions 38 is then honed to a smooth finish, as shown in FIGS. 4 and 5, so that a sheet is not ripped when gripped between the raised portion 38 and the gripper finger 16, as hereinabove described.

Figure 9:
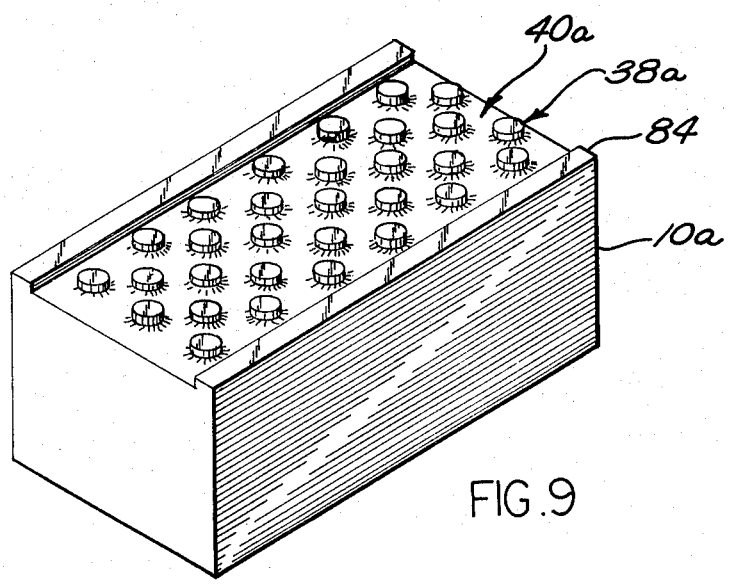
FIG. 9 is a perspective view of a second embodiment of the gripper post of the immediate invention.

A second embodiment of the gripper post of the present invention is shown in FIG. 9. For ease of description, the parts common to the gripper post shown in 55 FIG. 9 and the gripper post 10 shown in FIGS. 1–5 will be denoted with similar numerals with the suffix "a" appended thereto.

The gripper post 10a includes a plurality of raised portions 38a surrounded by complementary valleys 40a, as described in connection with the gripper post 10. The gripper post 10a has longitudinal ribs 84. The longitudinal ribs 84 are provided to eliminate ripping and tearing of the sheet when the sheet is gripped by the gripper post 10a and gripper finger 16a to convey a sheet through a printing press. When the gripper post 10a is used in the press, indicated at 86 in FIG. 10, the sheet is received and gripped between the gripper post 10a and the complementary gripper finger 16a on the impression cylinder 12a. The gripper finger 16a and gripper post 10a on the cylinder 12a hold the sheet as a portion of the sheet is conveyed through the printing nip 88 defined by the blanket cylinder 90 and impression cylinder 12a. The sheet is gripped by the gripper finger 16 a and gripper post 10a on the transfer cylinder 92 when the gripper fingers 16a and gripper post 10a reach the nip 94 defined by the impression cylinder 12a and transfer cylinder 92. The gripper finger 16a and gripper post 10a on the impression cylinder 12a subsequently release the sheet so that it may continue through the press.

After a portion of the sheet has been conveyed through the printing nip 88, the sheet tends to stick to the blanket cylinder 90 due to the tackiness of the ink on the blanket cylinder and has a path generally described by the dotted lines, indicated at 96. Thus, movement of the sheet with respect to the gripper fingers 16a and gripper post 10a is induced and the raised portions 38a tend to cut into the sheet. The longitudinal ribs 84 eliminate such cutting of the sheet, since the gripping pressure is distributed over the entire length of the longitudinal ribs 84. Thus, the flexing and movement of the sheet as the sheet is conducted to the nip 94 does not create perforations or tears in the sheet as it is conveyed through the press.

Figure 10:
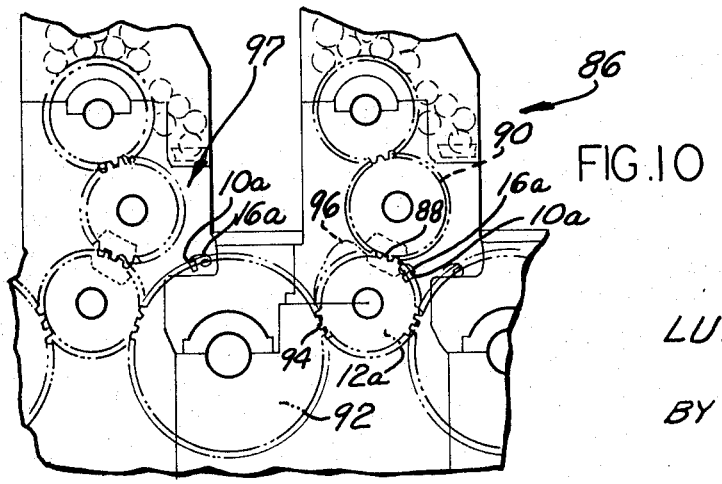
FIG. 10 is a side elevational view of a portion of a printing press having a plurality of printing units and embodying the gripper post of FIG. 9.

When the sheet is transferred from the impression cylinder 12a to the transfer cylinder 92, the gripper fingers 16a on the impression cylinder 12a release after the gripper fingers 16a on the transfer cylinder 92 have gripped the leading edge of the sheet. Since the longitudinal rib 84 is provided, the pressure of the gripper fingers 16a on the transfer cylinder 92 do not cut through the material, since the pressure is distributed over a large area and the sheet is transferred to another printing unit 97 of the printing press 86, as shown in FIG. 10.

Figure 7:
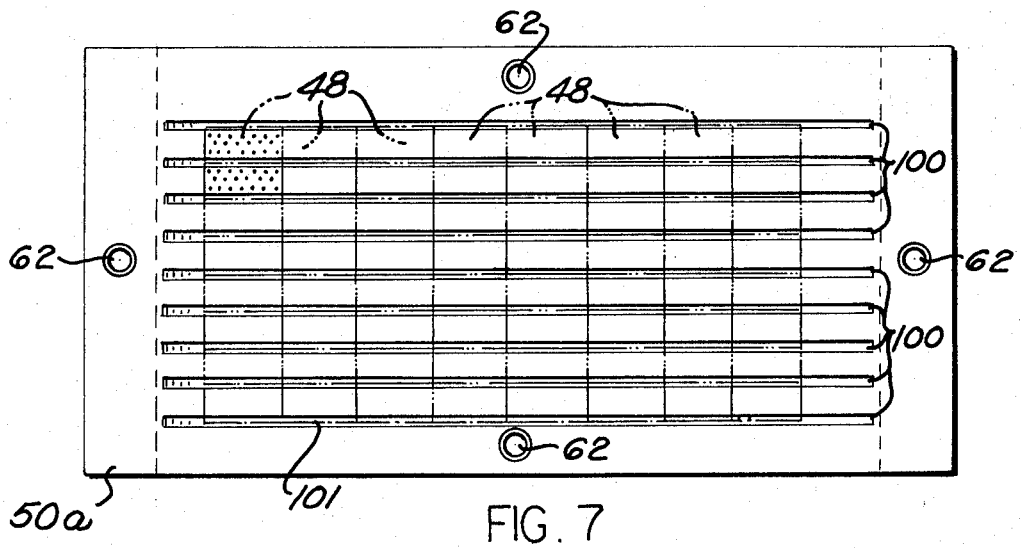
FIG. 7 is a bottom view of a portion of the electrical discharge machining apparatus shown in FIG. 6 after longitudinal grooves have been formed therein and taken along lines 7—7 thereof.

The gripper post 10a is formed in a manner similar to that described in connection with the gripper post 10. In order to form the longitudinal ribs 84 on the gripper post 10a, a plurality of longitudinal grooves 100 are provided in the electrode 50, as shown in FIG. 7. When a plurality of members 48 are mounted on the base 54, as described in connection with the gripper post 10 and shown as the matrix in phantom lines 101 in FIG. 7, the grooves 100 of the electrode are aligned with the members 48. The grooves are of a sufficient width so that the material defining the longitudinal rib 84 is not removed when opposite charges are induced in the electrode 50 and the members 48. The grooves 100 are of a sufficient width so that the adjacent members 48 are formed with adjacent longitudinal ribs 84 so that a plurality of gripper posts 10a are provided in one operation.

As the electrode 50a removes material from the members 48, the gripper post is formed having the longitudinal ribs 84 on both sides thereof. When the raised portions 38a of the gripper post 10a are subsequently ground or honed, the longitudinal ribs 84 are also ground on the same plane so that the sheet is uniformly held between the gripper post 10a and the gripper finger 16a. Thus, the sheet is not ripped or substantially deformed when such a gripping action occurs.

While only one geometric configuration of the raised portions 38 and 38a is shown, it is obvious that other arrangements and shapes are possible and capable of producing the desired result. For example, the raised portions need not necessarily be furnished with flat upper surfaces, even though the latter provide a desirable relatively level gripping surface. In addition, the raised portions need not have a circular configuration.

Having described my invention, I claim:

1. A gripper post for cooperating with a gripper finger to grip a sheet therebetween, said gripper post comprising a body and a plurality of bosses distributed throughout a surface of said body, said bosses having substantially coplanar contact surfaces for contacting the sheet when gripped and being defined by valleys surrounding said bosses, said post being made from a member constructed of metal by a process comprising the steps of hardening the surface of the member before forming said valleys, positioning an electrode having raised portions corresponding to the valleys and apertures extending therethrough and corresponding to said bosses of the gripper post adjacent to the hardened surface of the member, said apertures being configured and spaced apart from each other by a distance respectively corresponding with the desired configuration of and desired spacing of said bosses on said gripper post, providing a dielectric fluid between the electrode and the hardened surface of the member, inducing opposite electrical charges between the electrode and the member so that the dielectric fluid between the electrode and the member is ionized to erode the member to produce said valleys and bosses while simultaneously surface hardening said valleys, pressurizing said dielectric fluid to flow through said apertures of said electrode to wash away the metal removed from said member when opposite electrical charges are induced between the electrode and the member and finally finishing the surfaces of said bosses.

* * * * *